(12) United States Patent
Sivaramakrishnan et al.

(10) Patent No.: US 8,839,025 B2
(45) Date of Patent: Sep. 16, 2014

(54) SYSTEMS AND METHODS FOR RETIRING AND UNRETIRING CACHE LINES

(75) Inventors: Ramaswamy Sivaramakrishnan, San Jose, CA (US); Ali Vahidsafa, Palo Alto, CA (US); Aaron S. Wynn, San Jose, CA (US); Connie W. Cheung, Sunnyvale, CA (US)

(73) Assignee: Oracle International Corporation, Redwood City, CA (US)

( * ) Notice: Subject to any disclaimer, the term of this patent is extended or adjusted under 35 U.S.C. 154(b) by 213 days.

(21) Appl. No.: 13/250,443

(22) Filed: Sep. 30, 2011

(65) Prior Publication Data

US 2013/0086417 A1    Apr. 4, 2013

(51) Int. Cl.
| | | |
|---|---|---|
| *G06F 11/00* | (2006.01) | |
| *G06F 11/16* | (2006.01) | |
| *G06F 12/12* | (2006.01) | |
| *G06F 9/30* | (2006.01) | |
| *G06F 12/08* | (2006.01) | |
| *G06F 11/20* | (2006.01) | |

(52) U.S. Cl.
CPC ........ *G06F 11/1666* (2013.01); *G06F 12/0844* (2013.01); *G06F 2212/1008* (2013.01); *G06F 12/0804* (2013.01); *G06F 11/20* (2013.01); *G06F 12/126* (2013.01); *G06F 9/30* (2013.01)
USPC ........................... 714/6.13; 711/123; 711/128

(58) Field of Classification Search
USPC ....................................................... 714/6.13
See application file for complete search history.

(56) References Cited

U.S. PATENT DOCUMENTS

| | | | | |
|---|---|---|---|---|
| 5,025,366 A | * | 6/1991 | Baror ............................. | 711/128 |
| 5,070,502 A | * | 12/1991 | Supnik .......................... | 714/6.13 |
| 5,136,691 A | * | 8/1992 | Baror ............................. | 711/139 |
| 5,185,878 A | * | 2/1993 | Baror et al. .................... | 711/123 |
| 5,627,992 A | * | 5/1997 | Baror ............................. | 711/133 |
| 5,629,950 A | * | 5/1997 | Godiwala et al. ............. | 714/805 |
| 5,666,482 A | * | 9/1997 | McClure ....................... | 714/6.13 |
| 6,006,299 A | * | 12/1999 | Wang et al. .................... | 710/108 |
| 7,069,494 B2 | | 6/2006 | Cargnoni et al. | |
| 7,523,346 B2 | * | 4/2009 | Barlow et al. ................. | 714/6.32 |
| 7,594,145 B2 | * | 9/2009 | Ishihara et al. ............... | 714/47.2 |
| 7,689,891 B2 | | 3/2010 | Bell, Jr. et al. | |
| 7,770,067 B2 | | 8/2010 | Lockwood et al. | |
| 2003/0084389 A1 | | 5/2003 | Kottapalli et al. | |
| 2006/0179174 A1 | * | 8/2006 | Bockhaus et al. ............. | 710/22 |
| 2007/0294587 A1 | * | 12/2007 | Ishihara et al. ................ | 714/42 |
| 2008/0005616 A1 | * | 1/2008 | Barlow et al. .................. | 714/30 |
| 2010/0088550 A1 | | 4/2010 | Imai et al. | |
| 2012/0317367 A1 | * | 12/2012 | Grayson et al. ............... | 711/143 |

* cited by examiner

*Primary Examiner* — Kamini Patel
(74) *Attorney, Agent, or Firm* — Robert C. Kowert; Meyertons, Hood, Kivlin, Kowert & Goetzel, P.C.

(57) ABSTRACT

The systems and methods described herein may provide a flush-retire instruction for retiring "bad" cache locations (e.g., locations associated with persistent errors) to prevent their allocation for any further accesses, and a flush-unretire instruction for unretiring cache locations previously retired. These instructions may be implemented as hardware instructions of a processor. They may be executable by processes executing in a hyper-privileged state, without the need to quiesce any other processes. The flush-retire instruction may atomically flush a cache line implicated by a detected cache error and set a lock bit to disable subsequent allocation of the corresponding cache location. The flush-unretire instruction may atomically flush an identified cache line (if valid) and clear the lock bit to re-enable subsequent allocation of the cache location. Various bits in the encodings of these instructions may identify the cache location to be retired or unretired in terms of the physical cache structure.

20 Claims, 6 Drawing Sheets

SYSTEMS AND METHODS FOR RETIRING AND UNRETIRING CACHE LINES

BACKGROUND

1. Field of the Disclosure

This disclosure relates generally to computer systems, and more specifically to systems and methods for retiring and unretiring cache locations.

2. Description of the Related Art

Modern processors incorporate a variety of caches for storing data, instructions, address translations, state information, and/or other information that is likely to be accessed frequently, or that is likely to be accessed soon after a first access by a particular application or process. In the absence of in-line correction, when errors are detected in a cache, they may be reported to a software process that takes any necessary corrective action. A cache location with a stuck-at fault, a weak bit cell, or another persistent (or frequently recurring) error may generate frequent error reports to the error handling software, which can lead to an unacceptable loss of performance in the system. Some systems provide mechanisms for retiring such bad cache locations.

In some previous systems, retiring and unretiring cache locations are performed by issuing diagnostic writes to the state array of the cache to set or reset the lock bits for the cache locations being retired or unretired. However, in these previous systems, all threads other than the one performing the retiring or unretiring operations must be halted in order to perform the operations because the state array update requires an isolated read-modify-write access. Otherwise, if other threads are running, they could potentially update the same state array entry as the one for the cache location being retired/unretired and thus corrupt the cache state.

SUMMARY

The systems and methods described herein may in various embodiments provide mechanisms for retiring a "bad" cache location so that it cannot be allocated for any further accesses. In some embodiments, this may improve performance of the system by preventing future errors at that cache location and the corresponding need to report and/or handle those errors. In some embodiments, the systems may also provide mechanisms to unretire a cache location that has been retired.

In some embodiments, the systems described herein may detect an error in a cache that is associated with a particular cache line. For example, an error may be detected in the data stored in a cache location, a tag associated with the cache location, or the state of the cache location or corresponding cache line. In response to detecting the cache error, the systems may execute a flush-retire instruction, which may be a single hardware instruction that causes the computer to atomically perform flushing the cache line to memory and retiring the cache location that held the cache line. For example, flushing the cache line may include flushing the cache line to the next level of a cache hierarchy, to local or remote system memory, and/or to a persistent storage device (e.g., disk storage), in various embodiments. Retiring the cache location may include marking the cache location to disable subsequent allocation of the cache line (e.g., by setting a lock bit or allocate bit associated with the cache line or location).

In some embodiments, subsequent to retiring a particular cache location, the cache location may be unretired, e.g., by executing a flush-unretire instruction. The flush-unretire instruction may be a single hardware instruction that re-enables subsequent allocation of the cache location. (e.g., by clearing or resetting a lock bit or allocate bit associated with the cache line or location). In some embodiments, one or more fields in the encodings of the flush-retire instruction and the flush-unretire instruction may include data usable to identify the targeted cache location in terms of its location within the physical structure of the targeted cache. For example, various bits of the hardware instruction may identify the affected cache (e.g., L2 or L3), bank number, row number, and/or way of the cache entry to be retired or unretired.

In some embodiments, the flush-retire instruction and the flush-unretire instruction may be executable only by processes executing in a hyper-privileged state. In some embodiments, these instructions may be executed (and may perform various flushing, retiring, and/or unretiring operations) without the need to quiesce any other processes executing on the computer.

In some embodiments, in response to detecting a cache error, the error may be reported to a service process that may log it for future analysis. In some embodiments, any cache location implicated in a cache error report may be aggressively retired as soon as it is detected and/or reported. In such embodiments, if a subsequent analysis determines that the implicated cache location need not have been retired, it may be unretired. In other embodiments, cache locations may not be retired until an analysis is performed on the cache error report (e.g., in the context of other reported cache errors) and unless such analysis determines that the reported error is a persistent one. If a service process determines that a particular cache location should be retired or unretired, it may send an indication to a hyper-privileged process that the particular cache location should be retired or unretired. The hyper-privileged process may subsequently execute a flush-retire or flush-unretire instruction, as appropriate.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF THE EMBODIMENTS

As noted above, when errors are detected in a cache (e.g., by one or more processes that request access to the cache or by another process that monitors performance of the system), they may be reported to a software process that takes any necessary corrective action. A cache location with a stuck-at fault, a weak bit cell, or another persistent (or frequently recurring) error may generate frequent error reports to the error handling software, which can lead to an unacceptable loss of performance in the system. The systems and methods described herein may provide mechanisms for retiring such a cache location (which may sometimes referred to herein as a "cache entry" and may contain data corresponding to a "cache line") so that it cannot be allocated for any subsequent accesses. In some embodiments, retiring a bad cache location (and thereby preventing its subsequent use) may prevent the generation of future error reports corresponding to the bad cache location (and the corresponding need to handle the reported errors), such that the system performance loss due to cache errors is held to an acceptable level. In some embodiments, mechanisms to unretire a cache location that has previously been retired (e.g., a bad cache location or cache location suspected of being bad) may also be provided.

In various embodiments a cache may include a tag array, a data array, and a state array. The tag array may store the portion of the addresses of the data stored in the cache that is usable to determine which cache lines are resident in the cache. The data array may hold the data for the resident cache lines. The state array may hold data indicating all relevant states of a cache line and/or a corresponding cache entry, including its coherency state and/or its "retire" state.

In embodiments that include a multi-way associative cache, a replacement algorithm may be used to resolve conflict misses. This replacement algorithm may pick a cache location to be allocated from a pool of available cache locations. In such embodiments, a state bit may used to track the allocation of cache locations by the replacement algorithm. This bit may sometimes be referred to as an "allocate" bit, or a "lock" bit. When set, this bit may indicate that a corresponding cache location has already been allocated for a pending miss, thus removing it from the pool of cache locations that are available to the replacement algorithm. During normal operation, this bit may be reset (i.e. cleared) by a cache line fill operation.

A stuck-at bit, weak bit cell or other persistent (or recurring) error-inducing phenomenon may require frequent software intervention unless these errors are hardware correctable. The systems and methods described herein may provide an instruction to hyper-privileged software for retiring a bad cache location, so that future cache errors involving the bad cache location (and the error reports they generate) are prevented. In some embodiments, the instruction may be a hardware instruction (i.e. a hardware-implemented operation resulting from the execution of an instruction of the processor's instruction set architecture) that atomically flushes the contents of an identified cache location (i.e. the contents of the cache line held in a bad cache location) and retires the cache location so that it cannot be subsequently re-allocated. In some embodiments, another hardware instruction may be provided that atomically flushes the contents of an identified cache location (one that was previously retired), if it is valid, and unretires the cache location so that it is re-enabled and may subsequently be re-allocated (including, e.g., by a replacement algorithm).

In some embodiments, the processor hardware may provide a flush operation that evicts a cache line from the cache (if it was valid), marks the line as invalid, and sends the data to the next lower level of the memory hierarchy. In some embodiments, the flush operation may include an option to retire (or unretire) the cache location at which the cache line that is being evicted is stored. For example, when an option to retire the cache location is selected, after the flush completes, the corresponding lock bit may be set (or may not be cleared, so that it remains set). By forcing the lock bit to be set and/or remain so, the cache entry cannot be subsequently accessed, and any replacement algorithm cannot place another cache line in the retired cache entry. In some embodiments, when an option to unretire a cache location that has previously been retired is selected, the contents of the corresponding cache line may not be flushed to the next level of the memory hierarchy (e.g., if the entry is assumed to be invalid), but the lock bit corresponding to the identified cache entry may be cleared after the flush operation completes. In some embodiments, selecting this option may return the identified cache entry to the pool of cache entries available to the replacement algorithm.

Figure 1:
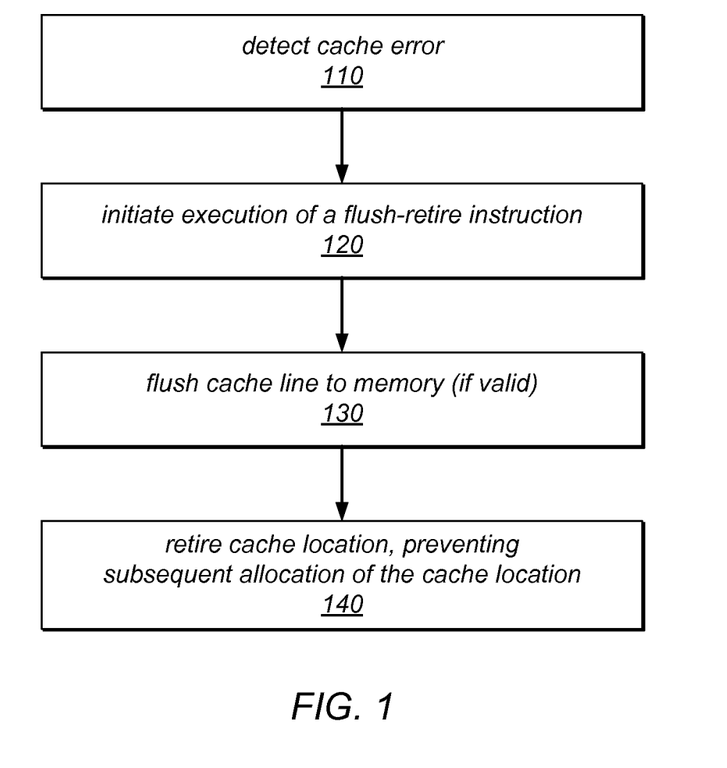
FIG. 1 is a flow diagram illustrating a method for retiring a cache location, according to one embodiment.

One embodiment of a method for retiring a cache location is illustrated by the flow diagram in FIG. 1. As illustrated at 110 in this example, the method may include detecting a cache error, e.g., an error in the data, tag, and/or state stored in or associated with a cache line or corresponding cache entry. In response to detecting the cache error, the method may include initiating the execution of an atomic flush-retire instruction, as in 120. When executed, this instruction may cause the contents of the affected cache entry to be flushed to memory (if the cache line is valid), as in 130, and to retire the cache location, as in 140, thereby preventing the cache location from being subsequently allocated.

Figure 2:
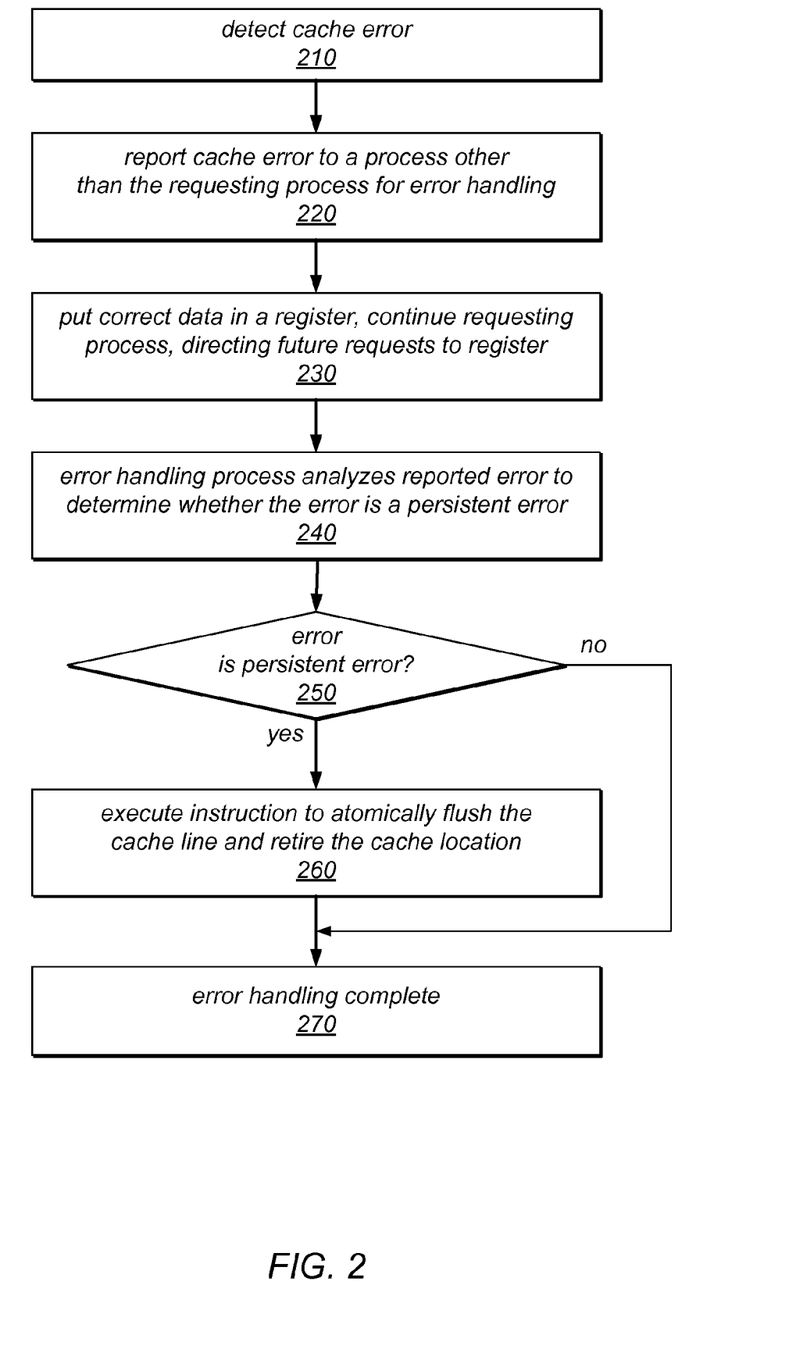
FIG. 2 is a flow diagram illustrating a method for using a flush-retire instruction in managing a cache, according to one embodiment.

One embodiment of a method for using a flush-retire instruction in managing a cache is illustrated by the flow diagram in FIG. 2. As illustrated in this example, the method may include detecting a cache error, as in 210, and reporting the error to a process other than the process requesting data from the corresponding cache line, as in 220. For example, in various embodiments, the error may be reported to a service process and/or a hyper-privileged process for error logging, analysis, and/or error handling. In some embodiments, in response to the cache error being detected and/or reported, the correct data for the requested cache line (or the requested portion thereof) may be placed in one or more registers, as in 230. At this point, the requesting process may continue execution, and future requests directed to the cache line (or a requested portion thereof) may be blocked and/or directed to the register(s) in which the correct data has been placed, in different embodiments.

As illustrated in this example, the method may include an error handling process that is distinct from the requesting process analyzing the reported error to determine whether the error is a persistent error, as in 240. As described in more detail below, the error handling process may apply various guidelines and/or policies to determine whether the reported error should trigger the retirement of the cache location, and such guidelines may be system-wide, application-specific, or user-configurable, and/or they may change over time, in different embodiments. The error handling process may run in parallel with one or more other processes (including the requesting process) and may be initiated periodically, or in response to the detection and/or reporting of one or more cache errors, in different embodiments.

If the error handling process determines that the error is a persistent one and, thus, that the corresponding cache location should be retired, shown as the positive exit from 250, the method may include executing an instruction to atomically flush the cache line and retire the cache location, as in 260. If the error handling process determines that the error is not a persistent one and that the cache location should not be retired at this point, shown as the negative exit from 250, the error handling may be complete, as in 270. Note that in other embodiments, some or all of the operations illustrated at 220-240 may be performed in a different order than that shown in FIG. 2 or may not be performed at all.

Figure 3:
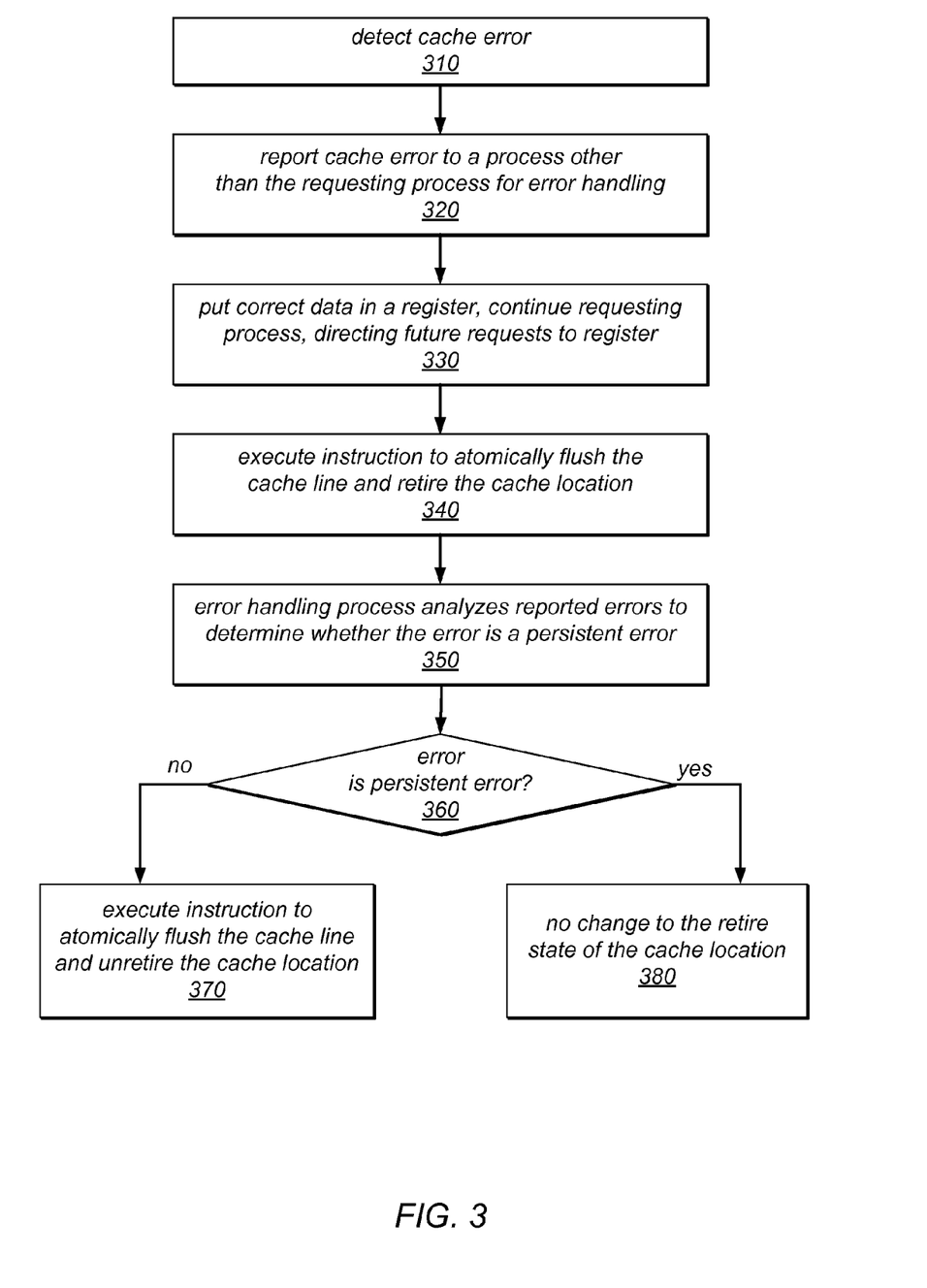
FIG. 3 is a flow diagram illustrating another embodiment of a method for using a flush-retire instruction in managing a cache.

Another embodiment of a method for using a flush-retire instruction in managing a cache is illustrated by the flow diagram in FIG. 3. As illustrated in this example, in some embodiments, a flush-retire instruction may initially be applied aggressively (e.g., in response to all cache errors), and its effects may be reversed in cases in which it may not have been necessary to permanently retire a given cache location. As illustrated in this example, the method may include detecting a cache error, as in 310, and reporting the cache error to a process other than the process requesting data from the corresponding cache line, as in 320. For example, in various embodiments, the cache error may be reported to a service process and/or a hyper-privileged process for error logging, analysis, and/or error handling. In some embodiments, in response to the cache error being detected and/or reported, the correct data for the requested cache line (or the requested portion thereof) may be placed in one or more registers, as in 330. At this point, the requesting process may continue execution, and future requests directed to the cache line (or a requested portion thereof) may be blocked and/or directed to the register(s) in which the correct data has been placed.

In this example, in response the cache error being detected and/or reported, the method may include executing an instruction to atomically flush the cache line and retire the cache location, as in 340. In this example, following the aggressive retiring of a cache location, an error handling process may perform an analysis of the cache error in the context of previously reported/logged cache errors (e.g., a statistical analysis of logged cache errors) to determine whether the reported cache error is a persistent one and/or whether retiring the cache location was appropriate, as in 350. As in the previous example, the error handling process may apply various guidelines and/or policies to determine whether the reported cache error should trigger the retirement of the cache location, and such guidelines may be system-wide, application-specific, or user-configurable, and/or they may change over time, in different embodiments. The error handling process may run in parallel with one or more other processes (including the requesting process) and may be initiated periodically, or in response to the detection and/or reporting of one or more cache errors, in different embodiments.

If the error handling process determines that the cache error was not a persistent one and that the cache location need not have been retired at this point, shown as the negative exit from 360, the method may include executing an instruction to atomically flush the cache line (if valid) and unretire the cache location, as in 370. If the error handling process determines that the cache error was a persistent one and, thus, that retiring the cache location was appropriate, shown as the positive exit from 360, there may be no change made to the retire state of the aggressively retired cache location, as in 380. Note that in other embodiments, some or all of the operations illustrated at 320-340 may be performed in a different order than that shown in FIG. 3 or may not be performed at all.

As noted above, in some previous systems, cache line (or location) retiring and unretiring have been performed by issuing diagnostic writes to the state array of the cache to set or reset the lock bit associated with the cache line (location) being retired or unretired. In these previous systems, all threads other than the one performing the retiring or unretiring operation had to be halted in order to perform the write operation because the state array update required an isolated read-modify-write access. Otherwise, if other threads were running, they could potentially update the same state array entry as the one for the line (location) being retired/unretired and thus corrupt the cache state. By contrast, the flush-retire and flush-unretire instructions described herein may be performed atomically. Therefore, other threads may not need to be halted in order to retire or unretire a cache location using these instructions.

In some embodiments, the flush instructions described herein (e.g., the flush-retire and/or flush-unretire instructions) may be implemented as store instructions to the I/O space of a targeted cache, e.g., by encoding information about the flush instructions in the address bits of the store instructions. In one such embodiment, various subsets of the address bits of such a store instruction may indicate the target cache, the index, and the way of the line to be flushed from the cache, and whether the corresponding cache entry should be retired (i.e. locked) after the flush completes.

The techniques described herein may be further illustrated by way of the following examples. These examples illustrate, respectively, flush-retire and flush-unretire operations for an L3 cache, and flush-retire and flush-unretire operations for an L2 cache, according to one embodiment.

In the first example, an L3 tag array may be accessed through programmed I/O (PIO) reads and writes, or flushed through PIO writes, with the address constructed as follows. In this example, the "address" of such a write includes various fields whose values identify a particular processor within the system, and a particular unit within that processor. In this example, address bits above bit 32 are used to identify a particular L3 bank of a particular processor, and bits [31:0] are used to address locations within the identified L3 bank. For example, PA[47:32] may include bits encoded to indicate (among other things) an access to a non-cachable, non PCIe memory space, and identifiers of a specific set of processors (e.g., in a symmetric multi-processor, or SMP) and/or a socket of the identified SMP, similar to the encodings used to access a corresponding L3 data array. Bits 31:0 of the PA cover the following ranges for four L3 banks in the processor, with the remaining bit assignments, in this example, given in Table 1 below:

Bank 0:0x0100_0000-0x01F7_FFF8
Bank 1: 0x0900_0000-0x09F7_FFF8
Bank 2:0x1100_0000-0x11F7_FFF8
Bank 3:0x1900_0000-0x19F7_FFF8

TABLE 1

| Bit(s) | Field | Description |
|---|---|---|
| 26:24 | 3'b001 | L3 tag array access and flush function |
| 23 | tag/flush | Specifies usage mode: 1'b0 = L3 tag array access, 1'b1 = L3 flush. |
| 22:21 | flushtype | Applicable only if PA[23] == 1. Gives flush variant: 2'b00 = flush without locking a line out i.e. the Allocate state of a cache line remains unchanged. 2'b01 = flush, retire line - Flush the line before locking it out from further allocation i.e. the Allocate |

TABLE 1-continued

| Bit(s) | Field | Description |
|---|---|---|
| | | bit is set to prevent the line from being a replacement candidate and all other state is cleared.<br>2'b10 = unlock (unretire) line - Allocate bit is cleared, replacement way is recalculated, all other state remains unchanged.<br>2'b11 = same function as 2'b10. |
| 20:17 | way | L3 way. Encodings 4'b0000-4'b1011 index the 12 ways. Encodings 4'b1100-1111 result in undefined behavior. |
| 16:3 | index | L3 index |
| 2:0 | 3'b000 | Should be 0 (to yield an 8-byte-aligned address) |

In this example, the format of the write/read data is shown in Table 2 below.

TABLE 2

| Bit(s) | Field | Initial Value | R/W | Description |
|---|---|---|---|---|
| 63:31 | — | 0 | RO | Reserved |
| 30:6 | tag | 0 | RW | Tag (PA[46:22]) |
| 5:0 | ecc | 0 | RW | Tag ECC |

In the next example, the processor may provide a cache flush function for invalidating and coherently committing an L2 cache line to memory. As described herein, such a cache flush instruction may only be available to processes executing in a hyper-privileged mode. In this example, if the target L2 is in the same processor core as the strand that is performing the cache flush, then the cache flush may be performed using a PIO write that is local to the processor core and is not seen by the network control unit (NCU). If the target L2 is in a different processor core than the strand that is performing the cache flush, the cache flush may be accomplished using a series of PIO writes to NCU registers that provide a "backdoor" special purpose register (SPR) mechanism. In this example, this may be the only path for a strand outside the core to access the L2 in order to retire a cache line thereof, as its locations may not be mapped directly to the I/O address space. In this example, execution of a cache flush instruction while in a user mode or privileged mode may be equivalent to a NOP (no operation). The address format for the L2 cache flush, in this example, is shown in Table 3 below.

TABLE 3

| Bit | Field | Description |
|---|---|---|
| 63:48 | — | Reserved |
| 47:27 | Upper address bits same as for data array accesses | |
| 26:24 | — | Must be 3'b110 in this example. |
| 23:22 | select | 00₂ = flush without locking a line out i.e. the Allocate state of a cache line remains unchanged.<br>01₂ = flush, retire line - Flush the line before locking it out from further allocation i.e. the Allocate bit is set to prevent the line from being a replacement candidate and all other state is cleared.<br>10₂ = unlock (unretire) line - Allocate bit is cleared, replacement way is recalculated, all other state remains unchanged.<br>11₂ = unused |
| 21:17 | — | Reserved |
| 16:14 | way | Selects way in cache set. |

TABLE 3-continued

| Bit | Field | Description |
|---|---|---|
| 13:5 | index | L2 index or set. |
| 4:0 | — | Reserved, all zeros. |

Note that in this example, the cache flush address specifies the particular L2 cache way and set to be committed to memory. To flush a specific address, software generally issues a cache flush to all eight possible ways in an index. In some embodiments, if software can guarantee that the address will not be re-fetched during the flushing operation, software may use diagnostic reads to find which way contains the cache address and then issue a cache flush to that specific way. In some embodiments, a series of cache flushes to a particular L2 bank may be guaranteed complete if it is followed by any load to that bank (even a diagnostic load). In such embodiments, the completion of the load may indicate that the cache flush instructions are complete.

Note also that, in some embodiments, if a cache flush instruction detects a tag parity error, the error may be ignored because the L2 cache may not need information from the L2 tag array in order to complete the flush operation. In some embodiments, if the cache flush instruction detects a correctable error in the state array, the error may be corrected and the instruction replayed.

Further note that, in some embodiments, if a cache flush is performed when the L2 cache is disabled (i.e. if it is in L2 off mode), the cache flush instruction may be treated as a NOP. In such embodiments, the L2 cache may not modify its state for a cache flush instruction when the L2 cache is disabled. However, in some embodiments, a diagnostic write to the state array of the L2 cache may take effect even if the L2 cache is disabled offering a way for software to flush lines when the L2 cache is disabled.

In some embodiments, techniques similar to those described herein may be applied to retire and/or unretire cache lines other types of caches, such as translation lookaside buffers (TLBs) or other tables or data structures implemented as caches. In some such embodiments, hardware instructions similar to those described above may be provided to flush and retire or flush and unretire cache lines in these tables. In other embodiments, additional selection options (other values for various bits/fields described above) may be used to identify and target cache lines in any of these additional types of caches.

Figure 4:
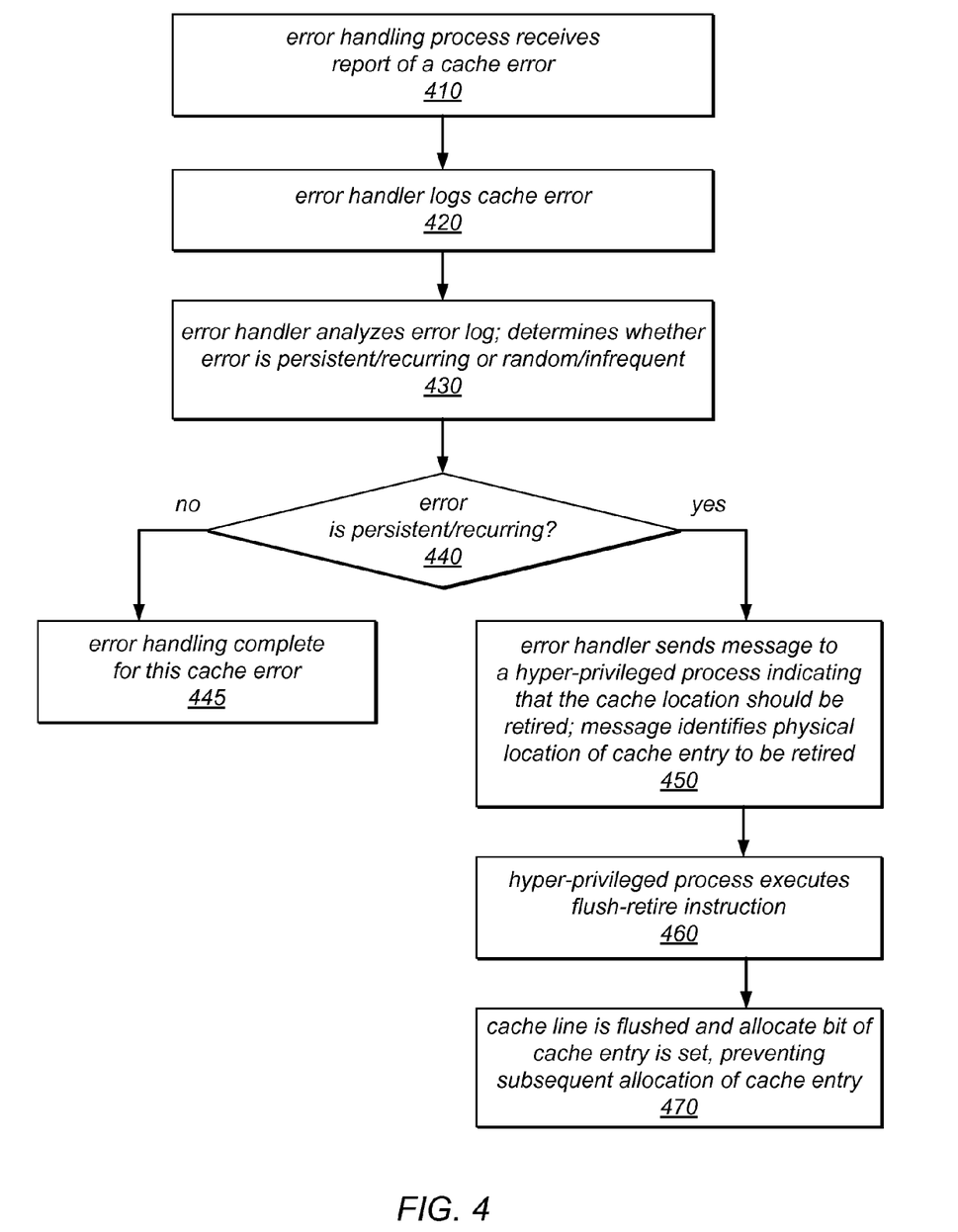
FIG. 4 is a flow diagram illustrating one embodiment of a method for handling a cache error.

One embodiment of a method for handling a cache error is illustrated by the flow diagram in FIG. 4. As illustrated at 410 in this example, the method may include an error handling process (or error handler) receiving a report indicating the detection of a particular cache error. The error handler may log the cache error (e.g., in a database, file, or data structure serving as an error log), as in 420. In some embodiments, the cache error may be reported to one process (e.g., a service process) that logs the cache error for future analysis and/or analyzes the cache error in the context of previously reported cache errors, and then another process (e.g., a hyper-privileged process) may be called to handle the cache error, dependent on the results of the analysis.

At some point (e.g., at a pre-determined or periodically determined time or in response to receiving this or another error report), the error handler may analyze the cache error log and may determine whether the particular cache error is a persistent (e.g., recurring) error or is a random (and/or infrequent) error, as in 430. For example, the error handler may be configured to determine (e.g., dependent on previously reported cache errors) whether the particular cache error occurs more often than would be expected for a random, intermittent failure, at a rate that is increasing over time, with a pattern that indicates a stuck-at failure or weak bit cell, or for every access directed to the same cache location (or the requested portion thereof). As previously noted, the error handling process may apply various guidelines and/or policies to determine whether the reported error should trigger the retirement of the cache location, and such guidelines may be system-wide, application-specific, or user-configurable, and/or they may change over time, in different embodiments. The error handling process may run in parallel with one or more other processes (including the requesting process) and may be initiated periodically, or in response to the detection and/or reporting of one or more cache errors, in different embodiments.

If the error handling process determines that the cache error is a persistent/recurring one and, thus, that the cache location should be retired, shown as the positive exit from 440, the method may include the error handler sending a message to a hyper-privileged process indicating that the cache location should be retired, as in 450. In some embodiments, the message may identify the physical location of the cache entry to be retired. For example, the message may include an identifier of the affected cache (e.g., L2 or L3), bank number, row number, and/or way of the cache entry to be retired. As illustrated at 460, in response to receiving this indication, the hyper-privileged process may execute a privileged atomic flush-retire instruction, such as that described herein. The cache line may then be flushed and the allocate bit for the cache entry may be set, as in 470. This may prevent any subsequent allocation of the cache location until and unless the retire state of the cache location is changed by another hyper-privileged instruction. If the error handling process determines that the cache error is not a persistent/recurring one and that the cache location should not be retired at this point, shown as the negative exit from 440, the error handling may be complete (as in 445) and there may be no change made to the retire state of the particular cache location.

Figure 5:
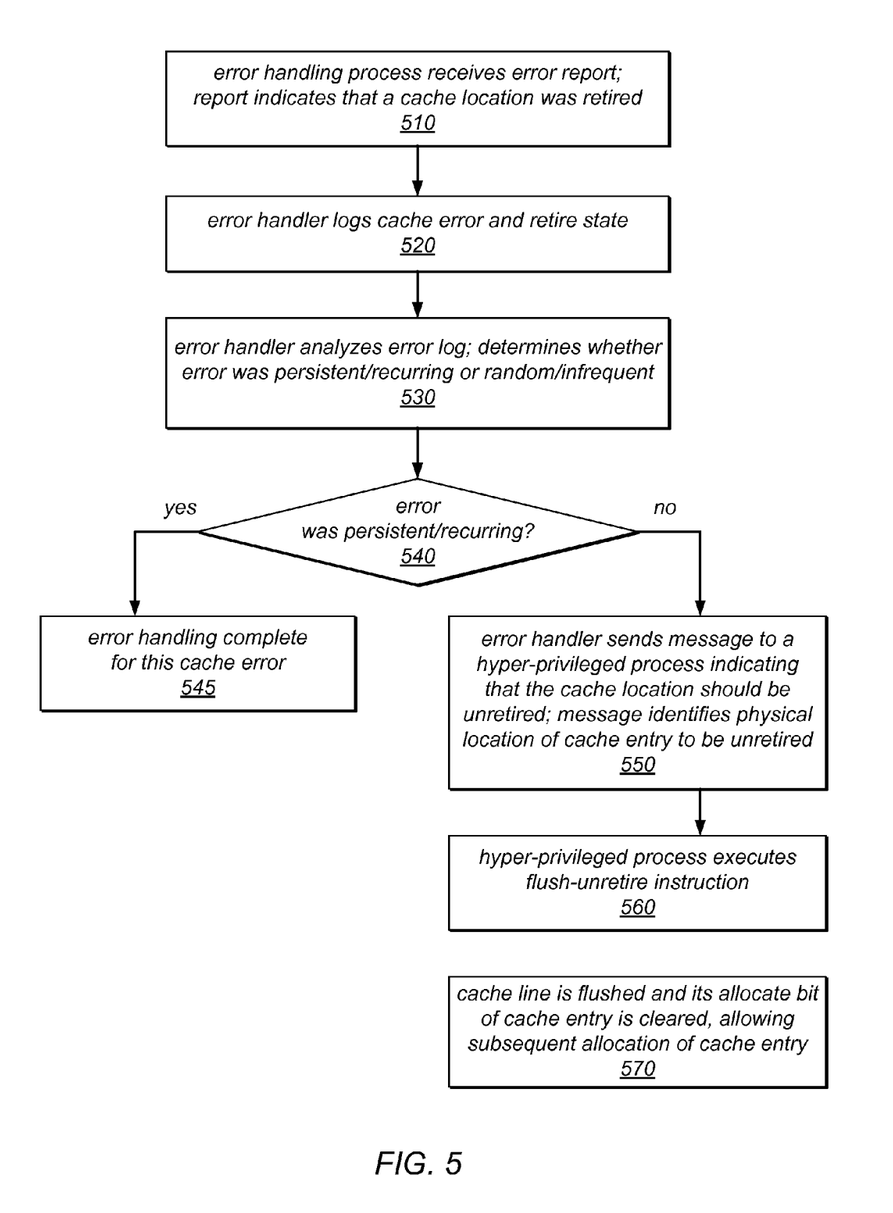
FIG. 5 is a flow diagram illustrating a method for reversing the effects of a cache location retirement, according to one embodiment.

One embodiment of a method for reversing the effects of a cache location retirement is illustrated by the flow diagram in FIG. 5. As illustrated at 510 in this example, the method may include an error handling process (or error handler) receiving a report that indicates the detection of a particular cache error, and an indication that the affected cache location has been retired. The error handler may log the cache error and/or the retire state of the cache location (e.g., in a database, file, or data structure serving as an error log), as in 520. In some embodiments, the cache error may be reported to one process (e.g., a service process) that logs the cache error for future analysis and/or analyzes the cache error in the context of previously reported cache errors, and then another process (e.g., a hyper-privileged process) may be called to handle the cache error, dependent on the results of the analysis.

At some point (e.g., at a pre-determined or periodically determined time or in response to receiving this or another error report), the error handler may analyze the cache error log and may determine whether the particular cache error is a persistent (e.g., recurring) error or is a random (and/or infrequent) error, as in 530. For example, the error handler may be configured to determine (e.g., dependent on previously reported cache errors) whether the particular cache error occurs more often than would be expected for a random, intermittent failure, at a rate that is increasing over time, with a pattern that indicates a stuck-at failure or weak bit cell, or for every access directed to the same cache location (or the requested portion thereof). As previously noted, the error handling process may apply various guidelines and/or policies to determine whether the reported cache error should have triggered the retirement of the cache location, and such guidelines may be system-wide, application-specific, or user-configurable, and/or they may change over time, in different embodiments. The error handling process may run in parallel with one or more other processes (including the requesting and/or reporting processes) and may be initiated periodically, or in response to the detection and/or reporting of one or more cache errors, in different embodiments.

If the error handling process determines that the cache error was not a persistent one and that the cache location need not have been retired at this point, shown as the negative exit from 540, the method may include the error handler sending a message to a hyper-privileged process indicating that the cache location should be unretired, as in 550. In some embodiments, the message may identify the physical location of the cache location to be unretired. For example, the message may include an identifier of the affected cache (e.g., L2 or L3), bank number, row number, and/or way of the cache entry to be unretired. As illustrated at 560, in response to receiving this indication, the hyper-privileged process may execute a privileged atomic flush-unretire instruction, such as that described herein. The cache line may then be flushed (if valid) and the allocate bit for the cache entry may be cleared, as in 570. This may re-enable (i.e. allow) allocation of the cache location (subsequent to the bit being cleared). If the error handling process determines that the cache error was a persistent/recurring one and, thus, that retiring the cache location was appropriate, shown as the positive exit from 540, error handling for this cache error may be complete (as in 545), and there may be no change made to the retire state of the previously retired cache location.

Figure 6:
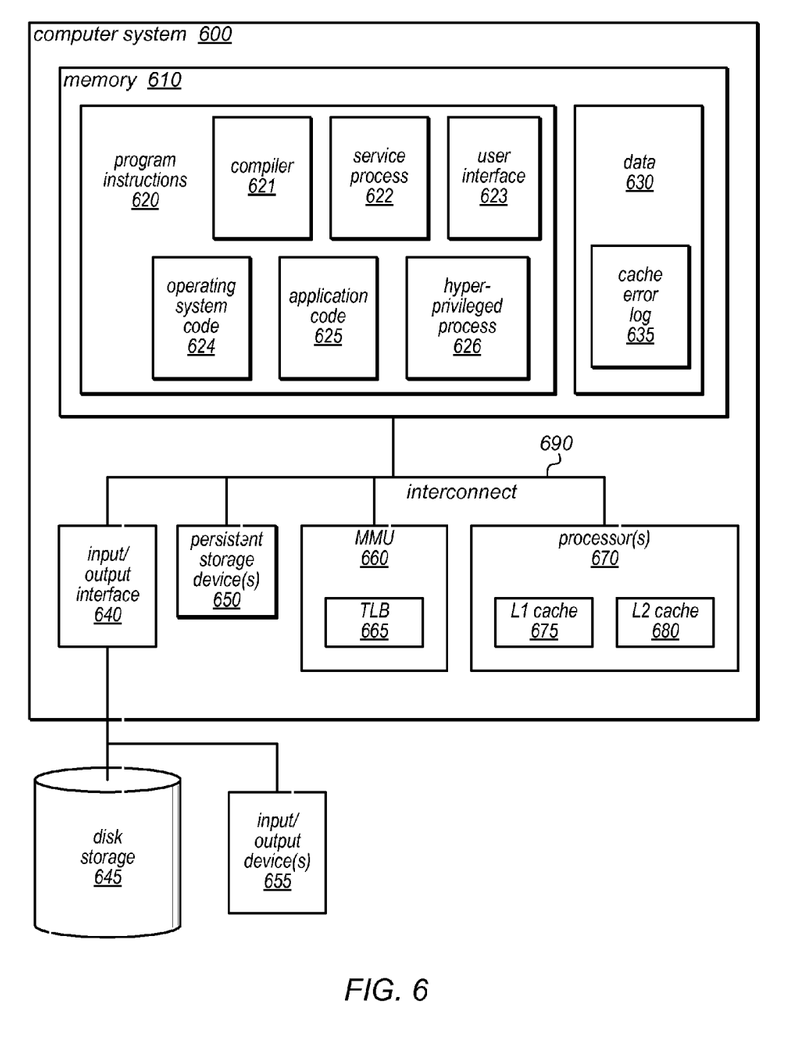
FIG. 6 is a block diagram of a computer system configured to implement the methods described herein, according to various embodiments.

The techniques described herein for retiring and/or unretiring cache locations may be implemented in any of a wide variety of computing systems that provide hardware instructions for flushing a cache line and retiring a corresponding cache location, and/or for flushing a cache line and unretiring a corresponding cache location. FIG. 6 illustrates a computing system configured to implement the methods described herein, according to various embodiments. The computer system 600 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

Various techniques for retiring and/or unretiring cache locations, as described herein, may be provided as a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In other embodiments, program instructions executable to perform the methods described herein may be communicated using optical, acoustical or other form of propagated signal (e.g., carrier waves, infrared signals, digital signals, etc.).

In various embodiments, computer system 600 may include one or more processors 670, each of which may include multiple cores (any of which may be single or multi-threaded), and each of which may provide hardware instructions for flushing a cache line and retiring a corresponding cache location, and/or for flushing a cache line and unretiring a corresponding cache location. For example, multiple processor cores may be included in a single processor chip (e.g., a single processor 670), and multiple processor chips may be included on a CPU board, two or more of which may be included in computer system 600. The techniques described herein may be applied in systems and/or processors in which a single thread runs on each processor core, or in systems and/or processors in which multiple threads are executed on each processor core, or on at least some of the processor cores implemented in a multi-core package or processor chip, in various embodiments. Each of the processors 670 may include one or more caches (e.g., one or more L1 caches 675 and/or one or more L2 caches 680), which may include a hierarchy of caches, in various embodiments. In some embodiments, computer system 600 may also include (or communicate with) one or more L3 caches (not shown), which may be on-chip caches or remote (off-chip) caches. The computer system 600 may also include one or more persistent storage devices 650 (e.g. optical storage, magnetic storage, hard drive, tape drive, solid state memory, etc) and one or more system memories 610 (e.g., one or more of cache, SRAM, DRAM, RDRAM, EDO RAM, DDR RAM, SDRAM, Rambus RAM, EEPROM, etc.). Various embodiments may include fewer or additional components not illustrated in FIG. 6 (e.g., video cards, audio cards, additional network interfaces, peripheral devices, a network interface such as an ATM interface, an Ethernet interface, a Frame Relay interface, etc.)

In some embodiments, computer system 600 may include an input/output interface 640 configured to facilitate communication between various components of computer system 600 and external devices, such as disk storage 645 and/or various input/output devices 655. Input/output interface 640 may be implemented as any suitable communication mechanism, in different embodiments. In some embodiments, computer system 600 may include a memory management unit (MMU 660), which may maintain one or more address translation tables, such as a translation lookaside buffer (TLB 665). In some embodiments, techniques similar to those described herein may be applied to TLB 665 (e.g., to retire and/or unretire cache locations in TLB 665).

The one or more processors 670, the storage device(s) 650, the MMU 660, the input/output interface 640, and the system memory 610 may be coupled to the system interconnect 690 and may communicate with each other through system interconnect 690. In general, interconnect 690 may be implemented as any broadcast, point-to-point, or hybrid communication mechanism such as a front side bus, Ethernet, InfiniBand™, etc.

One or more of the system memories 610 may contain program instructions 620. Program instructions 620 may be executable to implement one or more of a compiler 621, a service process 622, a user interface 623, operating system code 624, application code 625, and/or a hyper-privileged process 626 (e.g., a hypervisor, operating system component, or other highly privileged process that may have permission to execute an atomic flush-retire instruction and/or an atomic flush-unretire instruction, as described herein). In various embodiments, program instructions 620 may be encoded in platform native binary, any interpreted language such as Java™ byte-code, or in any other language such as C/C++, Java™, etc., or in any combination thereof Note that in some embodiments, different software modules included in program instructions (e.g., compiler 621, service process 622, user interface 623, operating system code 624, application code 625, and/or a hyper-privileged process 626) may be implemented in the same programming language, while in other embodiments, they may be implemented in different programming languages (in various combinations). The program instructions 620 may include functions, operations and/or other processes for accessing various cache lines and/or for retiring and/or unretiring cache locations, as described herein. Such support and functions may exist in one or more of the modules included in program instructions 620, in various embodiments. The system memory 610 may further comprise private and/or shared memory locations 630 where data may be stored. For example, cache error log 635 may store data that is accessible to multiple concurrently executing threads, processes, or transactions. Cache error log 635 may store data indicating detected cache errors and/or cache line retire states, in various embodiments. In various embodiments, the data stored in data area 630 may also include any other data usable in performing the techniques described herein and/or any other functionality provided by computer system 600.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A method, comprising:
performing, by a computer:
    detecting an error in a cache, wherein the error is associated with a particular cache line; and
    in response to said detecting, executing a flush-retire instruction, wherein the flush-retire instruction is a single hardware instruction of an instruction set architecture of a processor of the computer, and wherein said executing causes the computer to atomically perform:
        flushing the cache line to memory; and
        disabling subsequent allocation of a cache location that held the cache line.

2. The method of claim 1, wherein the error comprises an error in one or more of data stored in the cache location, a tag associated with the cache location, a state of the cache location, or a state of the cache line.

3. The method of claim 1, further comprising, subsequent to said executing, executing a flush-unretire instruction, wherein the flush-unretire instruction is a single hardware instruction, and wherein executing the flush-unretire instruction causes the computer to perform re-enabling subsequent allocation of the cache location.

4. The method of claim 1, wherein one or more fields in an encoding of the flush-retire instruction comprise data usable to identify the cache location in terms of its location within the physical structure of a targeted cache.

5. The method of claim 1, wherein the flush-retire instruction is executable only by processes executing in a hyper-privileged state.

6. The method of claim 1, wherein said flushing and said disabling are performed without quiescing any processes executing on the computer.

7. The method of claim 1, wherein said disabling comprises setting a lock bit associated with the cache location.

8. The method of claim 1, further comprising:
analyzing data representing the error and one or more other detected cache errors; and
determining whether the error is a persistent error; and
wherein said disabling is performed in response to determining that the error is a persistent error.

9. A system, comprising:
a processor; and
memory coupled to the processor and storing program instructions that when executed by the processor cause the processor to perform:
detecting an error in a cache, wherein the error is associated with a particular cache line; and
in response to said detecting, executing a flush-retire instruction, wherein the flush-retire instruction is a single hardware instruction of an instruction set architecture of the processor, and wherein said executing causes the processor to atomically perform:
flushing the cache line to the memory; and
disabling subsequent allocation of a cache location that held the cache line.

10. The system of claim 9, wherein when executed by the processor, the program instructions further cause the processor to perform, subsequent to said executing, executing a flush-unretire instruction, wherein the flush-unretire instruction is a single hardware instruction of the processor, and wherein executing the flush-unretire instruction causes the processor to perform re-enabling subsequent allocation of the cache location.

11. The system of claim 9, wherein the flush-retire instruction is executable only by processes executing in a hyper-privileged state.

12. The system of claim 9, wherein said flushing and said disabling are performed without quiescing any processes executing in the system.

13. The system of claim 9, wherein said disabling comprises setting a lock bit associated with the cache location.

14. The system of claim 9, wherein when executed by the processor, the program instructions further cause the processor to perform:
analyzing data representing the error and one or more other detected cache errors; and
determining whether the error is a persistent error; and
wherein said disabling is performed in response to determining that the error is a persistent error.

15. A non-transitory, computer readable storage medium storing program instructions that when executed by a computer that comprises a processor cause the computer to perform:
detecting an error in a cache, wherein the error is associated with a particular cache line; and
in response to said detecting, executing a flush-retire instruction, wherein the flush-retire instruction is a single hardware instruction of an instruction set architecture of the processor, and wherein said executing causes the computer to atomically perform:
flushing the cache line to memory; and
disabling subsequent allocation of a cache location that held the cache line.

16. The storage medium of claim 15, wherein when executed by the computer, the program instructions further cause the computer to perform, subsequent to said executing, executing a flush-unretire instruction, wherein the flush-unretire instruction is a single hardware instruction of the processor, and wherein executing the flush-unretire instruction causes the computer to perform re-enabling subsequent allocation of the cache location.

17. The storage medium of claim 15, wherein the flush-retire instruction is executable only by processes executing in a hyper-privileged state.

18. The storage medium of claim 15, wherein said flushing and said disabling are performed without quiescing any processes executing on the computer.

19. The storage medium of claim 15, wherein said disabling comprises setting a lock bit associated with the cache location.

20. The storage medium of claim 15, wherein when executed by the computer, the program instructions further cause the computer to perform:
analyzing data representing the error and one or more other detected cache errors; and
determining whether the error is a persistent error; and
wherein said disabling is performed in response to determining that the error is a persistent error.

* * * * *

UNITED STATES PATENT AND TRADEMARK OFFICE
CERTIFICATE OF CORRECTION

| | | |
|---|---|---|
| PATENT NO. | : 8,839,025 B2 | Page 1 of 1 |
| APPLICATION NO. | : 13/250443 | |
| DATED | : September 16, 2014 | |
| INVENTOR(S) | : Sivaramakrishnan et al. | |

It is certified that error appears in the above-identified patent and that said Letters Patent is hereby corrected as shown below:

In the Specification

In column 3, line 42, delete "may" and insert -- may be --, therefor.

In column 6, line 44, delete "non-cachable," and insert -- non-cacheable, --, therefor.

In column 7, line 55, delete "3'b110" and insert -- 3'b110, --, therefor.

Signed and Sealed this
Seventeenth Day of March, 2015

Michelle K. Lee
*Director of the United States Patent and Trademark Office*